(12) United States Patent
Aposhian et al.

(10) Patent No.: US 11,528,854 B2
(45) Date of Patent: Dec. 20, 2022

(54) ADJUSTING A SOD HARVESTER'S STACKING POSITION TO FORM VERTICALLY ALIGNED STACKS

(71) Applicant: FireFly Automatix, Inc., Salt Lake City, UT (US)

(72) Inventors: Steven R. Aposhian, Farmington, UT (US); Eric E. Aston, Farmington, UT (US); William M. Decker, Salt Lake City, UT (US); Mark C. LeBlanc, Salt Lake City, UT (US); Daniel A. Aposhian, West Valley City, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 8 days.

(21) Appl. No.: 17/177,619

(22) Filed: Feb. 17, 2021

(65) Prior Publication Data

US 2022/0256783 A1    Aug. 18, 2022

(51) Int. Cl.
*A01G 20/15* (2018.01)
*B65G 61/00* (2006.01)

(52) U.S. Cl.
CPC ............. *A01G 20/15* (2018.02); *B65G 61/00* (2013.01); *B65G 2203/0225* (2013.01); *B65G 2203/0258* (2013.01)

(58) Field of Classification Search
CPC ................... A01G 20/15; B65G 61/00; B65G 2203/0225; B65G 2203/0258; B65G 57/035; B65G 57/00; B65G 57/02; B65G 57/04; B66F 9/0755; B66F 9/082; B66F 9/16; B65F 3/043
USPC .... 172/19; 414/788, 792.7, 792.9, 793, 799; 700/217, 218, 250, 253; 901/46, 47
See application file for complete search history.

(56) References Cited

U.S. PATENT DOCUMENTS

| | | | |
|---|---|---|---|
| 5,812,409 A * | 9/1998 | Kanno | H05K 13/0812 324/757.01 |
| 9,022,720 B2 * | 5/2015 | Aposhian | B65G 47/24 414/791.7 |
| 10,155,632 B2 * | 12/2018 | Aposhian | B65G 47/648 |

* cited by examiner

*Primary Examiner* — Gregory W Adams
(74) *Attorney, Agent, or Firm* — Kirton McConkie; Brian Tucker

(57) ABSTRACT

A sod harvester's stacking position can be dynamically adjusted to form vertically aligned stacks. More particularly, a sod harvester's control system can be configured to automatically adjust the stacking position as a stack is being formed based on a sensed orientation of the pallet. In this way, the control system can ensure that a slab of sod that is dropped from the stacking head will fall into the intended location on the stack regardless of the orientation of the pallet relative to the stacking head.

17 Claims, 15 Drawing Sheets

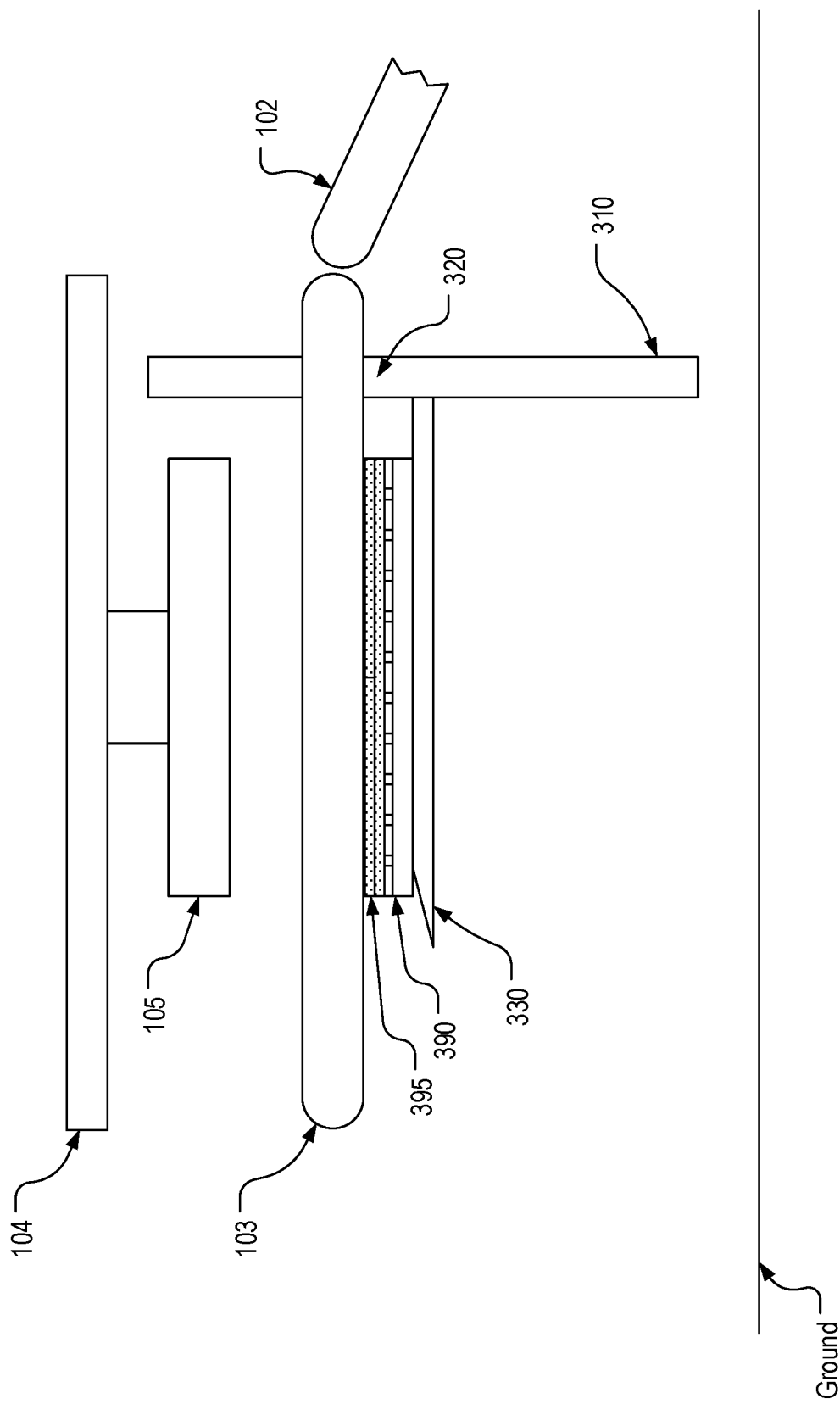

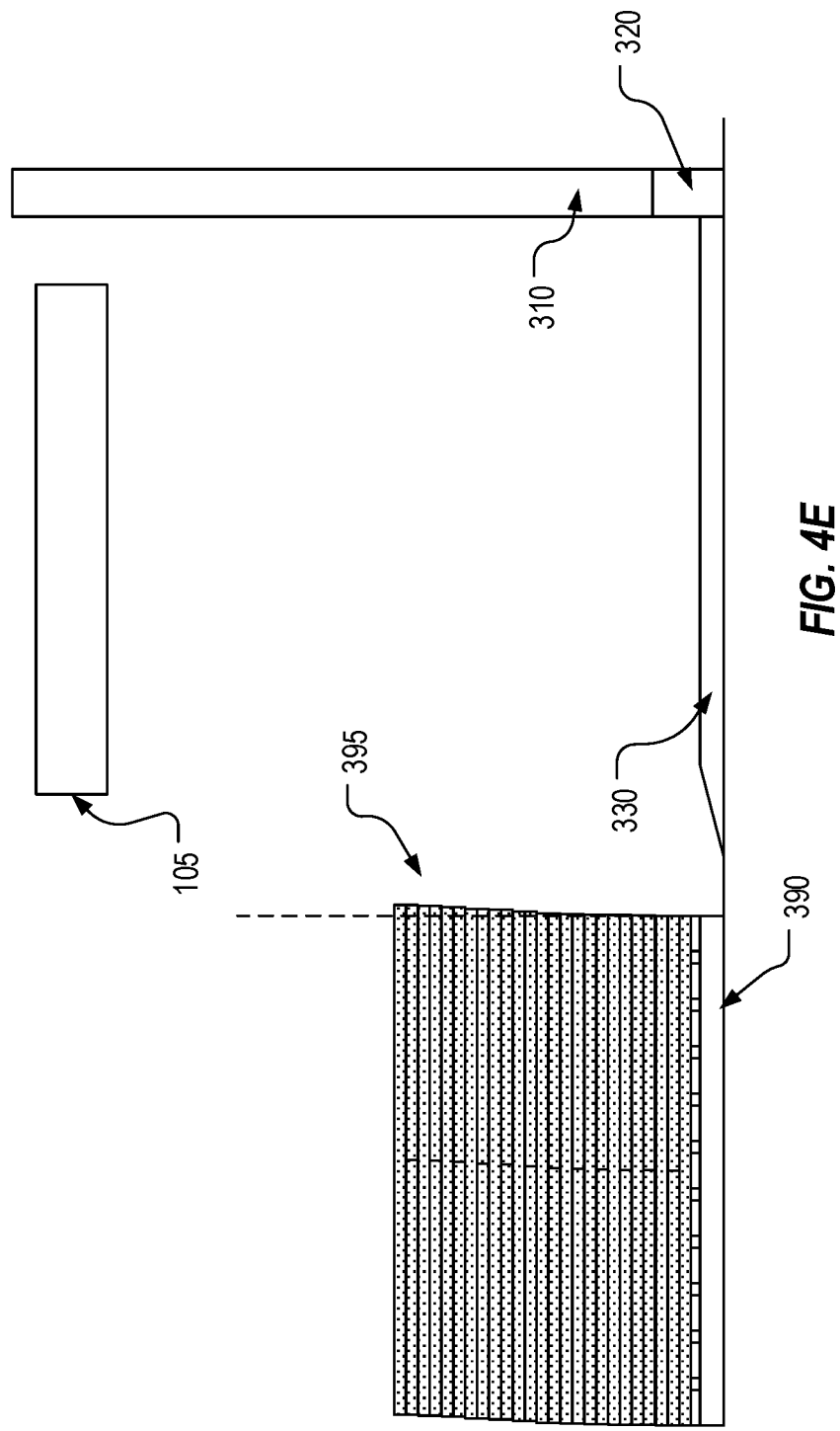

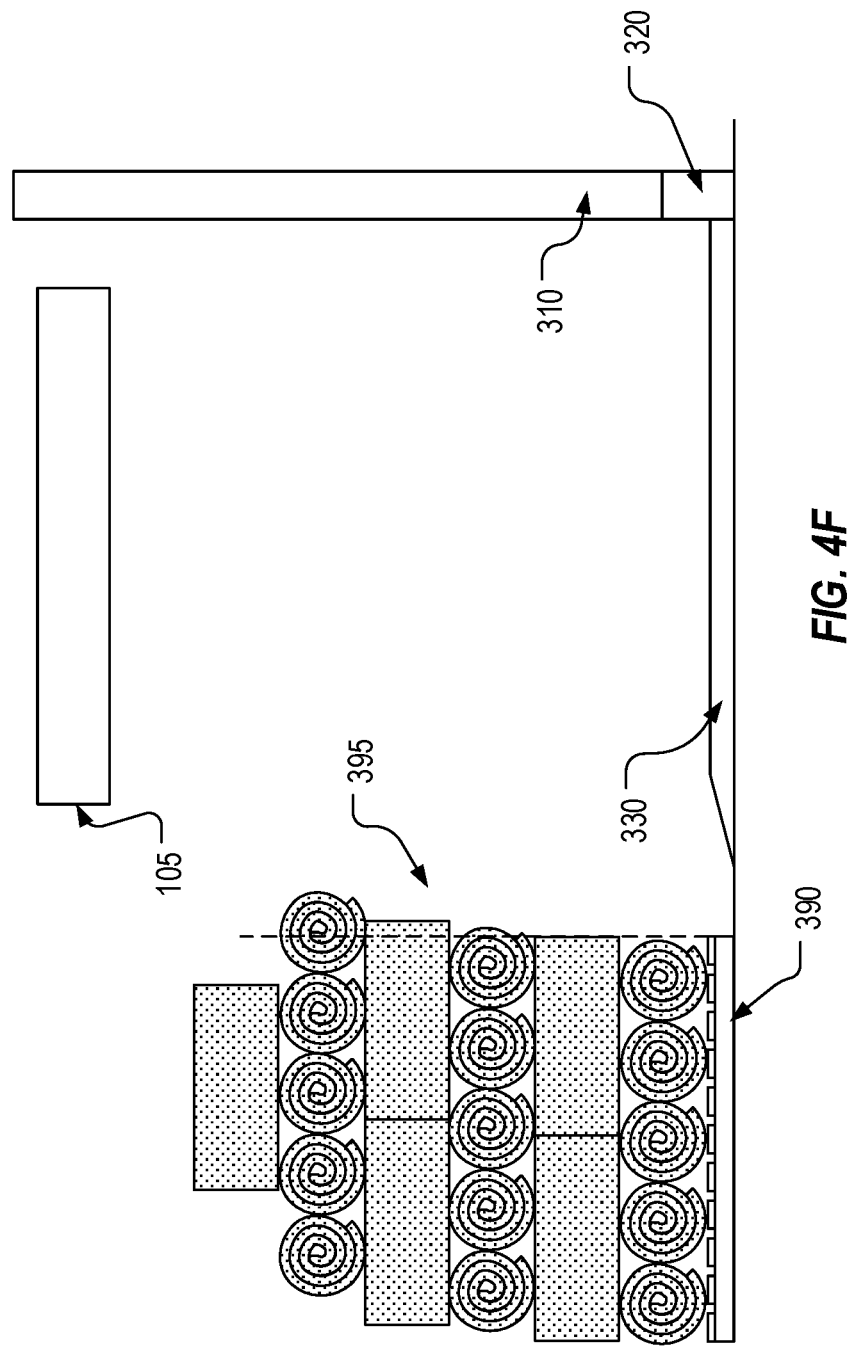

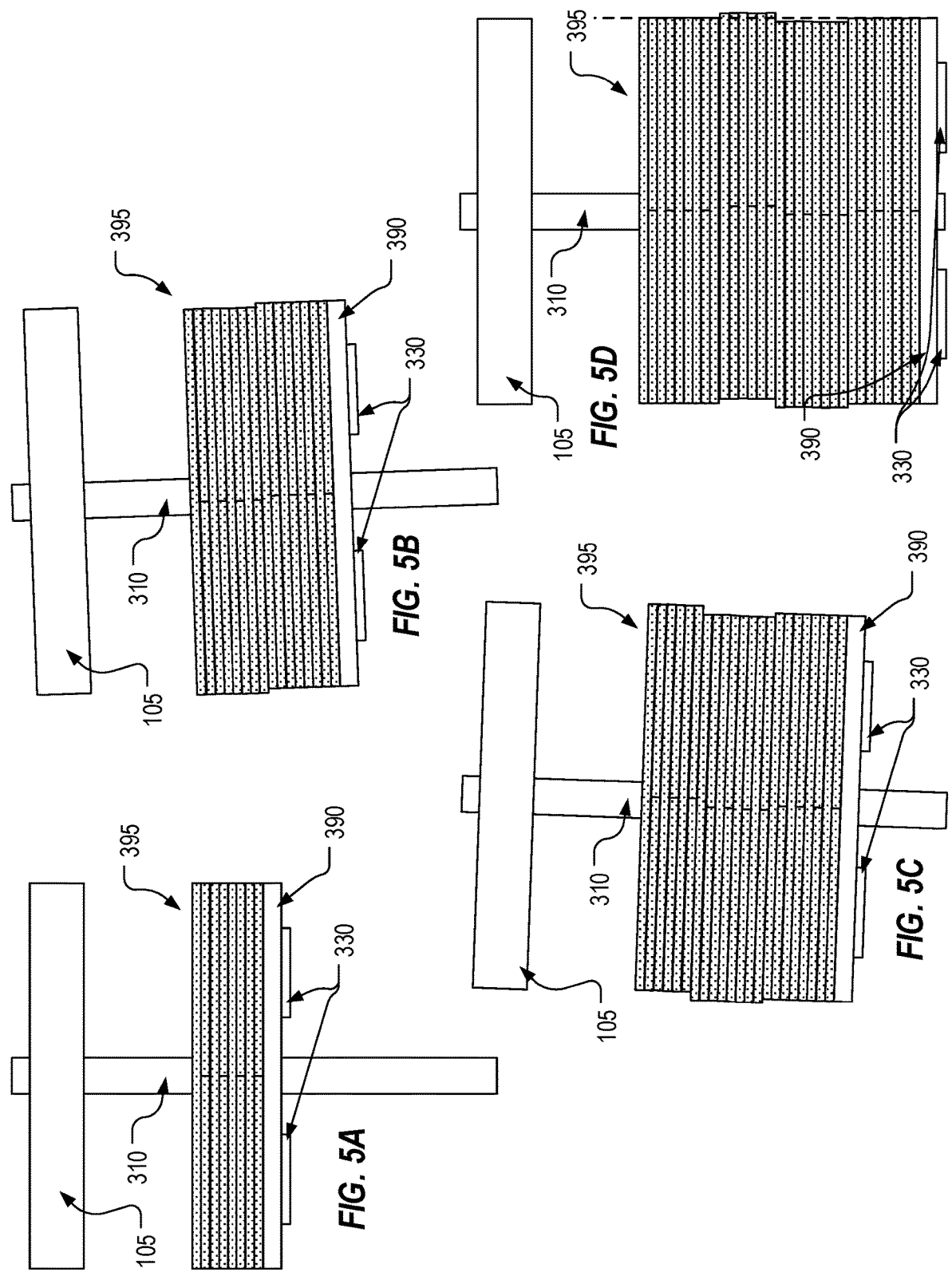

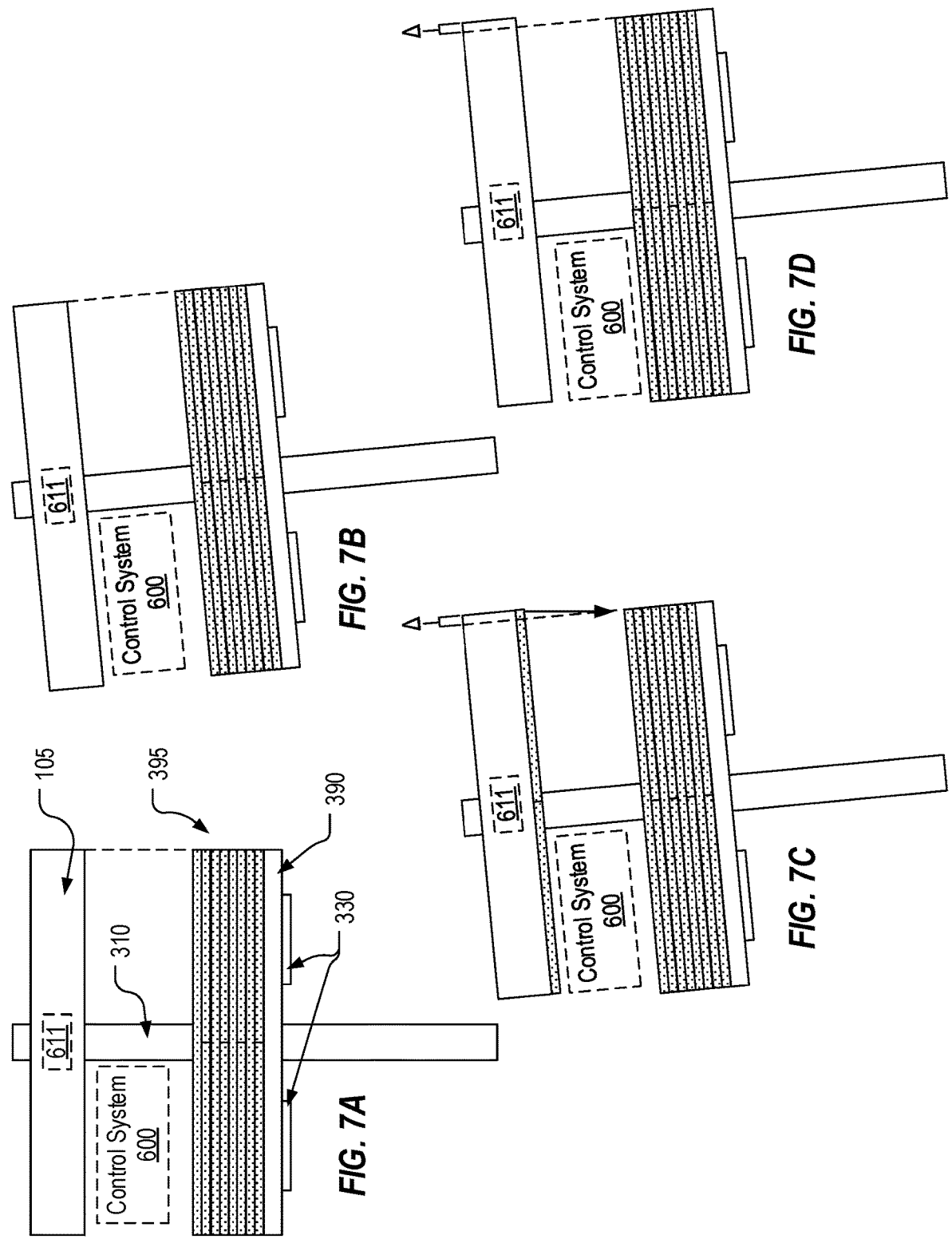

ADJUSTING A SOD HARVESTER'S STACKING POSITION TO FORM VERTICALLY ALIGNED STACKS

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1 and sod harvester 200 shown in FIG. 2. Sod harvesters 100 and 200 are both in the form of a tractor and include a cutting head 101, 201 that cuts slabs of sod from the ground, inclined conveyor(s) 102, 202 that elevate the slabs from the ground towards a stacking conveyor 103, 203, a stacking head 105, 205 that is mounted to a support mechanism 104, 204, and a pallet dispenser 106, 206 that is positioned adjacent a pallet support (not visible) on which stacking head 105, 205 stacks slabs that it has removed from stacking conveyor 103, 203.

Two general types of harvesters exist: slab harvesters such as sod harvester 100; and roll harvesters such as sod harvester 200. A roll harvester forms the slabs of sod into rolls (e.g., utilizing a roll forming mechanism 207) which are then accumulated on the stacking conveyor for pick up. A slab harvester, on the other hand, directly stacks the slabs in their flat form.

With both slab and roll harvesters, the harvester supports a pallet on which the sod is stacked. Once the stack has been completed, the harvester will place the stacked pallet on the ground where it will typically be retrieved by a forklift and transferred to a trailer or truck bed for transport to the customer's premises. If the sod is not stacked properly on the pallet, the stack may tip over or otherwise create difficulties during transport.

BRIEF SUMMARY

The present invention extends to techniques for adjusting a sod harvester's stacking position to form vertically aligned stacks. More particularly, a sod harvester's control system can be configured to automatically adjust the stacking position as a stack is being formed based on a sensed orientation of the pallet. In this way, the control system can ensure that a slab of sod that is dropped from the stacking head will fall into the intended location on the stack regardless of the orientation of the pallet relative to the stacking head.

In some embodiments, the present invention may be implemented as a method for adjusting a sod harvester's stacking position to form vertically aligned stacks. A stacking head a sod harvester can be positioned at a stacking position while stacking sod on a pallet that is supported by the sod harvester. While stacking sod on the pallet, an orientation of the pallet can be sensed. In response to sensing that the orientation of the pallet has changed, the stacking head can be positioned at an adjusted stacking position while stacking sod on the pallet.

In some embodiments, the present invention may be implemented as a control system of a sod harvester that is configured to adjust the sod harvester's stacking position to form vertically aligned stacks. The control system can continuously sense an orientation of a pallet on which a stacking head of the sod harvester is stacking sod. Based on the sensing, the control system can calculate an adjusted stacking position. The control system can then cause the stacking head to be positioned at the adjusted stacking position when stacking sod on the pallet to thereby cause a vertically aligned stack to be formed on the pallet.

In some embodiments, the present invention may be implemented as a sod harvester that includes: a cutting head for removing sod from the ground; one or more inclined conveyors for conveying the sod from the cutting head to a stacking conveyor; the stacking conveyor; a stacking head for removing the sod from the stacking conveyor and stacking the sod on a pallet; and a control system that detects an orientation of the pallet while the stacking head stacks the sod on the pallet and adjusts a stacking position of the stacking head based on the orientation of the pallet.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4A-4E provide an example of how a vertically misaligned stack may be formed due to an increasing deflection of a pallet support from the horizontal due to the increasing weight of the pallet;

FIG. 4F represents that the same vertical misalignment can occur when stacking rolls of sod;

FIGS. 5A-5D provide an example of how a vertically misaligned stack may be formed due to the sod harvester travelling over a sloped area;

FIGS. 7A-7D provide an example of how a control system of a sod harvester can dynamically adjust the stacking position of the stacking head while the sod harvester is travelling over a sloped area.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle. The sod harvester may stack the sod as slabs or rolls. The term "control system" should encompass any combination of hardware and/or software. For example, a control system may include hardware- and/or software-based circuitry such as, but not limited to, a central processing unit, a microprocessor, a microcontroller, a field programming gate array, an application-specific integrated circuit, a system on a chip, etc. The "x, y plane" of a sod harvester can represent the plane that extends from front to back and from side to side of the sod harvester. Therefore, when the sod harvester is on flat ground, the x, y plane would be horizontal.

Figure 1:
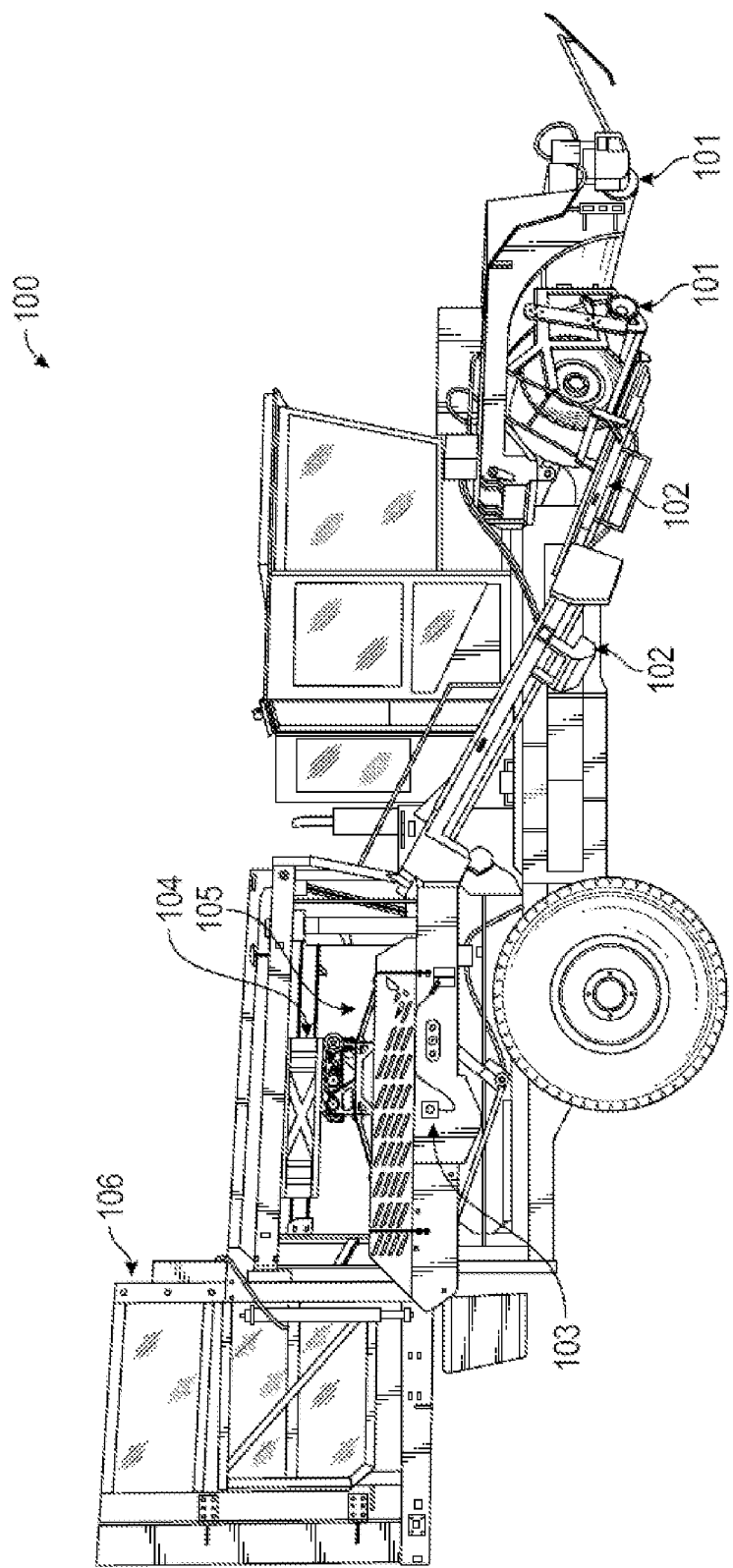
FIG. 1 illustrates a prior art sod harvester that harvests sod in slabs.
Figure 2:
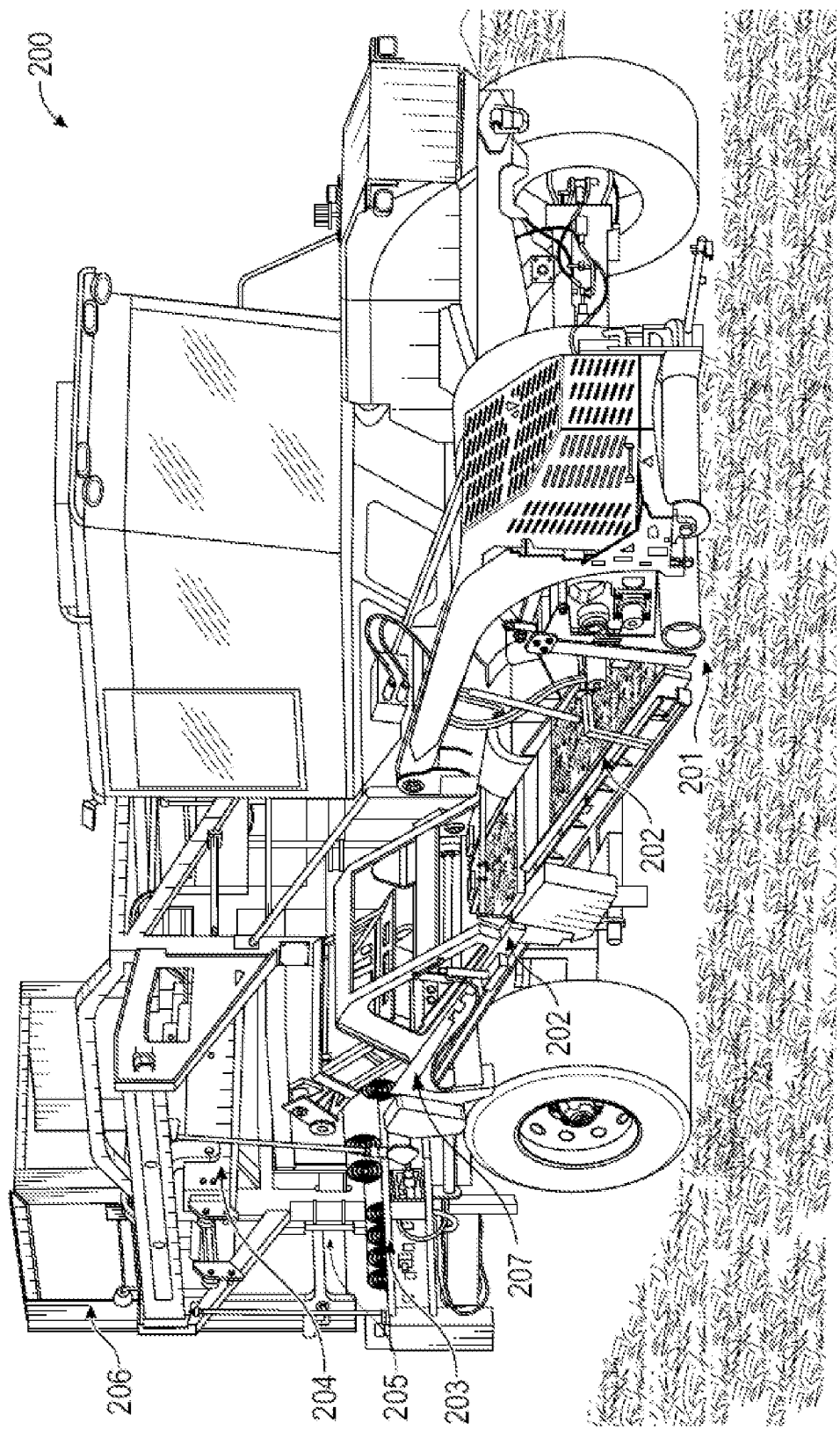
FIG. 2 illustrates a prior art sod harvester that harvest sod in rolls.
Figure 3:
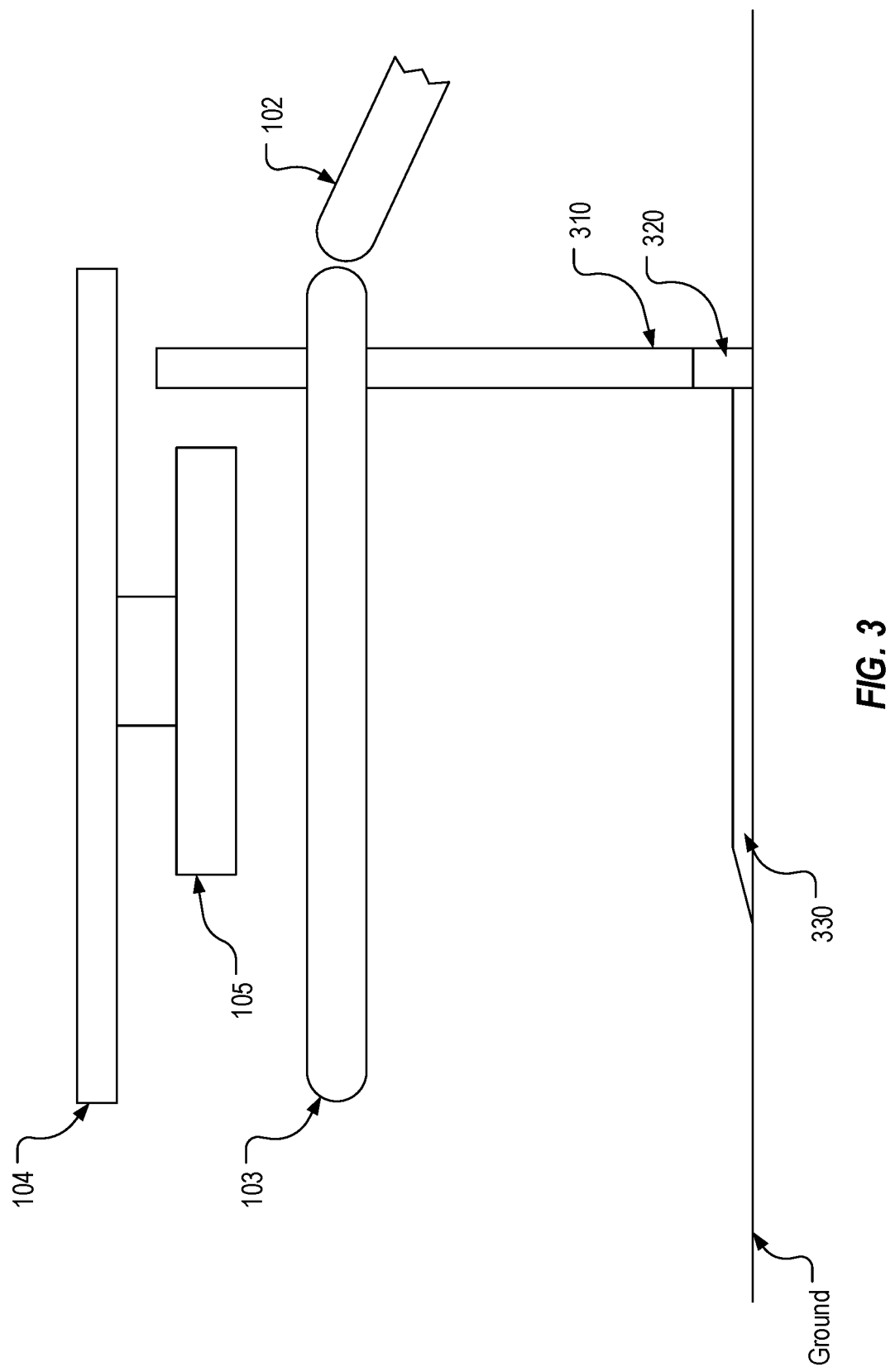
FIG. 3 provides an example of various components that a sod harvester may include to enable sod to be stacked on a pallet using a stacking head FIGS. 3A and 3B provide an example of how the components of FIG. 3 operate to stack sod.

FIG. 3 provides a simplified side view of various components of sod harvester 100 that are employed to stack sod on a pallet. Sod harvester 200 may include similar components. These components include inclined conveyor 102, stacking conveyor 103, support mechanism 104 and stacking head 105 as introduced in the background along with a pallet support assembly that includes a pallet support 330 (which may in the form of forks), a vertical channel 310 and a travelling mechanism 320 that couples pallet support 330 to vertical channel 310. Travelling mechanism 320 can be moved vertically within vertical channel 310 to cause pallet support 330 to initially be positioned towards stacking head 105 and to be incrementally lowered to accommodate additional layers of sod. In such cases, stacking head 105 may not descend to place the sod on pallet 390 but may drop it from some distance above pallet 390.

Figure 3B:
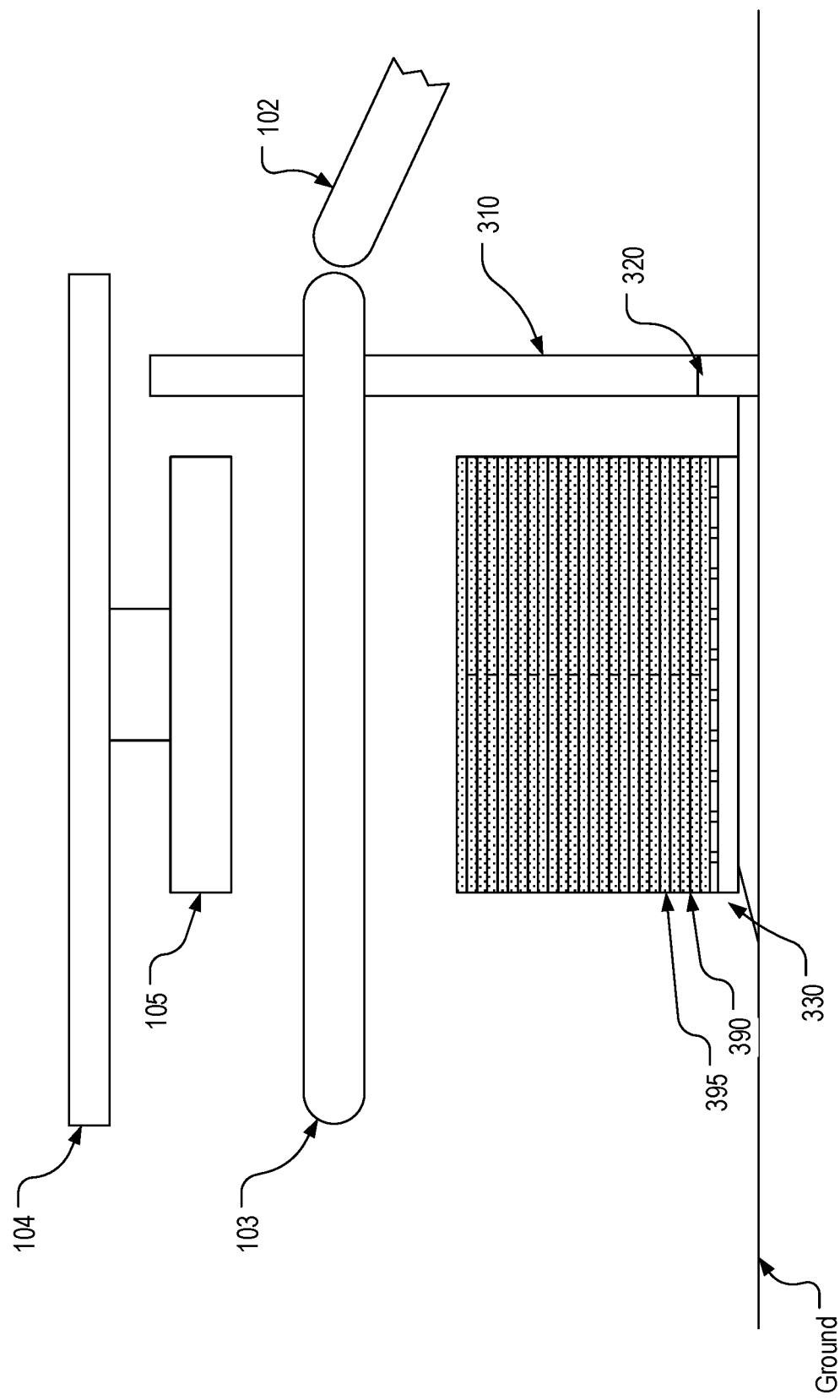

FIGS. 3A and 3B provide an example of how pallet support 330 can be moved downwardly as sod 395 is stacked on a pallet 390 that it supports. In FIG. 3A, a stack is beginning to be formed on pallet 390. Accordingly, pallet support 330 is positioned upwardly towards stacking head 105. It is noted that, in some embodiments, the sod harvester may be configured with temporary pallet supports that support the pallet initially while sod is being stacked thereon and while pallet support 330 lowers the completed pallet to the ground. In such cases, one or more layers of sod may already be stacked on pallet 390 before pallet support 330 is raised up to support pallet 390.

Once a layer is complete, travelling mechanism 320 could be driven to incrementally lower pallet 390 to await the next layer. This process can be repeated until a complete stack is formed. Once a complete stack is formed, travelling mechanism 320 can be driven to lower pallet support 330 to the ground as represented in FIG. 3B. A push arm (not shown) can then be advanced to push pallet 390 off pallet support 330 and onto the ground. Although not shown, during this process, sod may continue to be stacked on a pallet that is supported by temporary pallet supports. Once pallet 390 has been removed from pallet support 330, travelling mechanism 320 can be driven to lift pallet support 330 upwardly to support the next pallet, and the process can be repeated.

Although not shown, when stacking head 105 picks up sod from stacking conveyor 103, it could travel overtop pallet 390 and drop the sod onto the stack. The position that stacking head 105 is in when it drops the sod (or otherwise causes the sod to be released onto pallet 390) will be referred to as the stacking position. The stacking position correlates with the shape and position of pallet 390. Notably, depending on the shape and size of the sod, there may be multiple stacking positions for each layer. For example, in FIGS. 3A and 3B, it is assumed that each layer includes two slabs of sod with each layer being rotated 90 degrees relative to the previous layer. It is also assumed that stacking head 105 stacks a single slab of sod at a time. Accordingly, in this example, the stacking head may have four different stacking positions—one for each possible orientation of a slab of sod.

Because sod will fall directly downward once it is released from stacking head 105, a sod harvester's control system can be configured to move stacking head 105 to stacking positions that are directly above the respective location on pallet 390. These stacking positions could be considered default stacking positions. By consistently moving stacking head 105 to the same stacking position(s), in theory, a vertically aligned stack should be formed as represented in FIG. 3B. In other words, each slab of sod should be dropped directly on top of any slab that has the same orientation in the stack. In practice, however, this oftentimes is not the case. FIGS. 4A-4E and 5A-5D represent two scenarios that can cause the stack to be vertically misaligned.

Figure 4B:
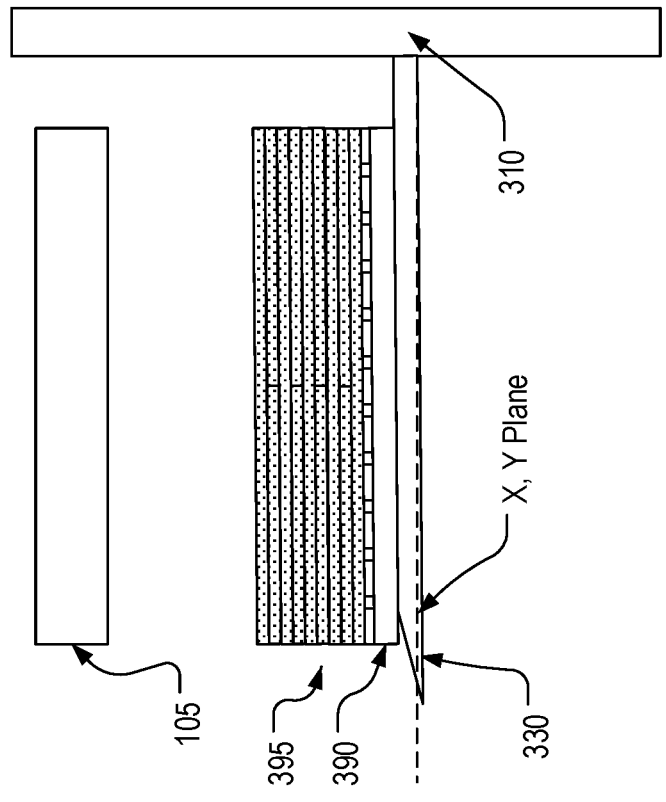
Figure 4A:
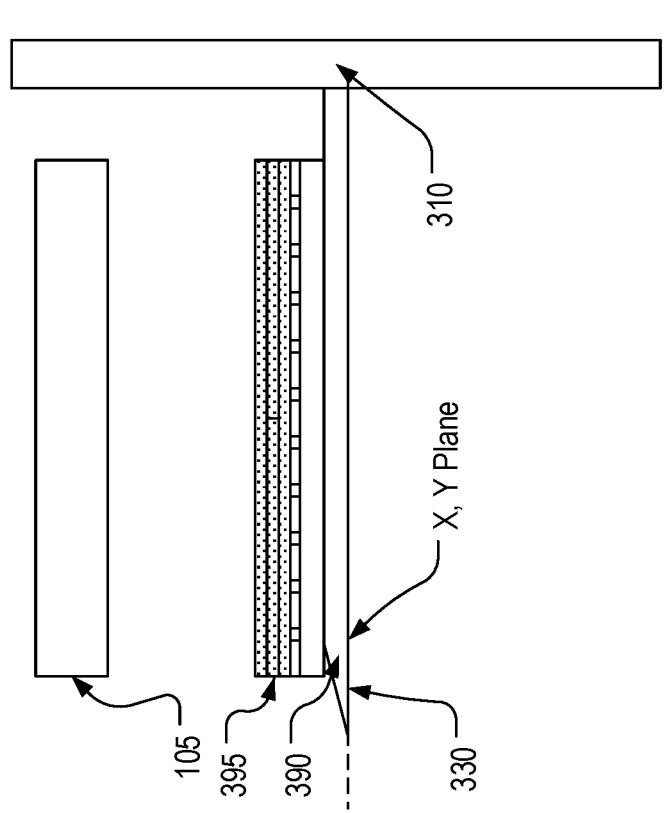

FIGS. 4A-4E are based on FIGS. 3A and 3B but show that pallet support 330 may deflect downwardly as sod 395 is stacked on pallet 390 due to the weight of sod 395. In FIG. 4A, only three layers of sod have been stacked on pallet 390 and the weight is insufficient to deflect pallet support 330 from the x, y plane. When pallet support 330 is not deflected, it will be substantially parallel with stacking head 105. For example, assuming the sod harvester is on flat ground, both stacking head 105 and pallet support 330 will be aligned with the horizontal. Therefore, as stacking head 105 drops sod and the sod falls straight down onto pallet 390, the stack will remain vertically aligned.

In contrast, in FIG. 4B, nine layers of sod have been stacked which has caused pallet support 330 to deflect downwardly from the x, y plane. Because the front end of pallet support 330 is supported by vertical channel 310, the rear end of pallet support 330 deflects downwardly thereby causing pallet support 330 and pallet 390 to be angled toward the rear. On the other hand, stacking head 105 remains aligned with the x, y plane, and as a result, pallet support 330 is no longer directly below stacking head 105. In other words, the stacking positions of the stacking head will no longer align with the intended locations on the pallet.

Figure 4D:
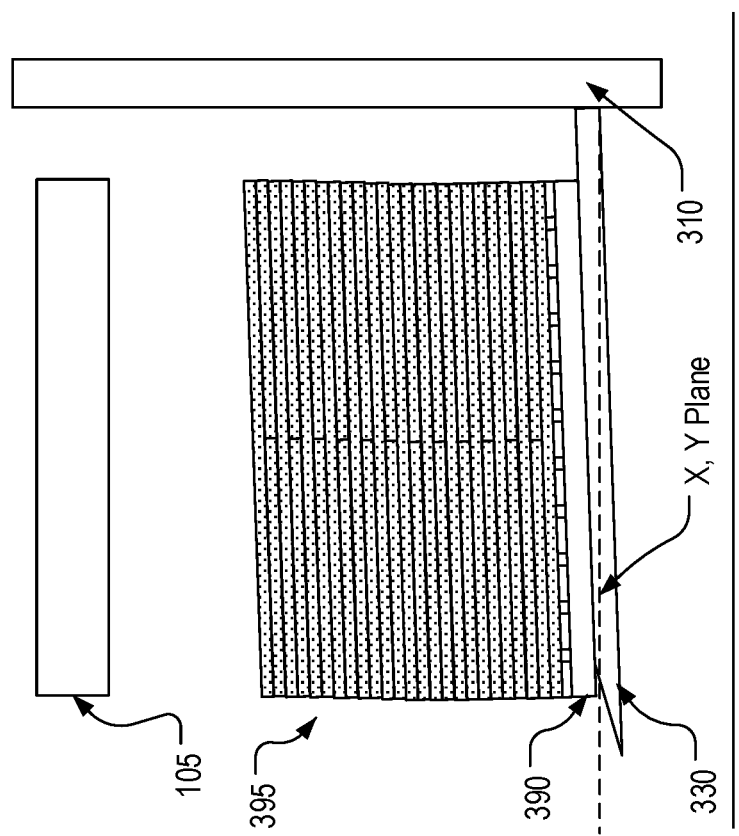
Figure 4C:
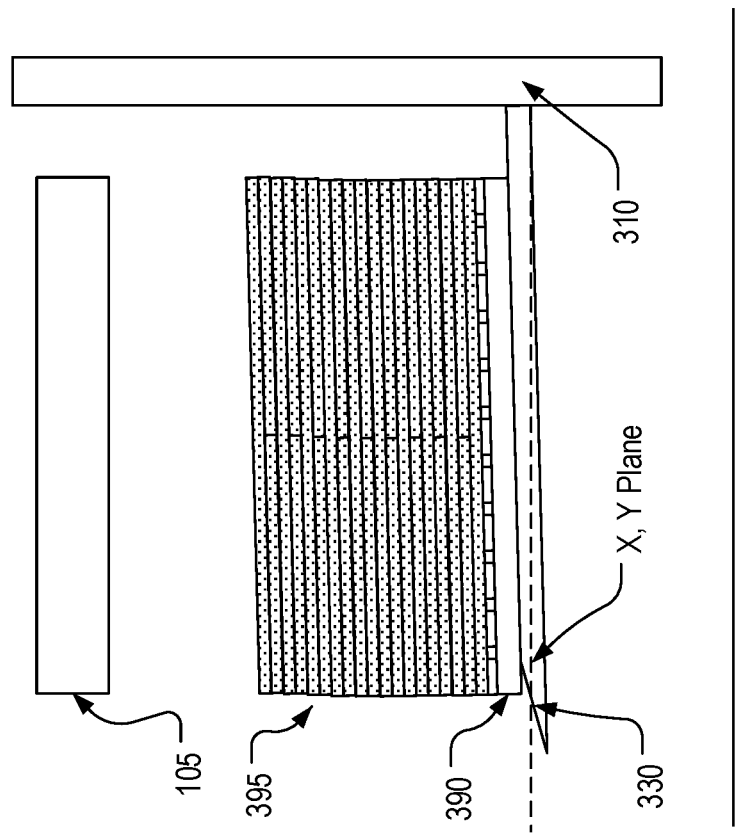

FIGS. 4C and 4D represent the vertical misalignment that is created in the stack as additional sod is stacked while pallet support 330 is deflected from the x, y plane. As the rear end of pallet support 330 is deflected downwardly, it causes the rear side of pallet 390 to pivot downwardly which, in essence, causes the stack, and particularly the top of the stack, to shift rearwardly relative to stacking head 105. Therefore, as additional slabs are dropped onto the stack from the static stacking positions, they will be positioned frontwardly of the previously stacked slabs. Although this frontward shift may be small between each additional layer, the end result is a frontward leaning stack as represented in FIG. 4E. When the sod is heavy, such as may be the case when harvesting sod after a rainstorm or irrigation, the deflection of pallet support 330 may be sufficient to compromise the integrity of the stack.

FIGS. 5A-5D provide a rear view of the components shown in FIG. 3 and represent how a vertically misaligned stack may be formed when the sod harvester is travelling over a sloped area (e.g., when harvesting sod on a hill). In such cases, the x, y plane of the sod harvester will not be aligned with the horizontal. In FIG. 5A, it is assumed that the sod harvester has not yet reached the sloped area and therefore pallet support 330 and stacking head 105 remain parallel with the horizontal. In contrast, in FIG. 5B, the sod harvester has reached an area that slopes downwardly to the left. As a result, both pallet support 330 and stacking head 105 are angled downwardly to the left. Although pallet support 330 and stacking head 105 may remain parallel, sod dropped from stacking head 105 will fall straight down and land to the left of slabs that were stacked prior to the sod harvester reaching the sloped area.

In FIG. 5C, it is assumed that the sod harvester has travelled into an area that slopes downwardly to the right. At this point, the slabs will fall straight down and land to the right of the previously stacked slabs. FIG. 5D then represents the completed stack. As shown, there is a section of layers that are offset to the left and a section of layers that are offset to the right corresponding to the times when the sod harvester was harvesting on the leftward and rightward sloped areas respectively.

This vertical misalignment can occur whenever the sod harvester harvests a sloped area including when going downhill or uphill. In particular, when going downhill, the sod may be forwardly offset, whereas when going uphill, the sod may be rearwardly offset. Notably, even if the entire pallet is stacked when harvesting on the same sloped area, the sod itself may be vertically aligned but it would be offset relative to the pallet (e.g., the sod may be hanging over an edge of the pallet). Also, this vertical misalignment from harvesting on a sloped area may occur in conjunction with the vertical misalignment that occurs when pallet support 330 deflects from the x, y plane of the sod harvester.

In accordance with embodiments of the present invention, a sod harvester can include a control system that is configured to dynamically adjust the stacking position of the stacking head to prevent the stack from becoming vertically misaligned. The control system can employ one or more sensors to detect when the orientation of the pallet has changed (e.g., when the pallet support is deflected from the x, y plane) and in response can adjust the stacking position of the stacking head to ensure that sod is stacked in vertical alignment. Additionally or alternatively, the control system can employ one or more sensors to detect when the sod harvester is travelling over a sloped area (which again would cause the orientation of the pallet to change) and in response can adjust the stacking position of the stacking head to ensure that sod is stacked in vertical alignment.

FIGS. 6A-6E provide an example of how a control system 600 of a sod harvester (e.g., sod harvester 100 or 200) can employ a sensor (or multiple sensors) 610 to detect when pallet support 330 is deflected from the x, y plane and in response can adjust the stacking position of stacking head 105. Sensor 610 can represent any of variety of sensors that could be used and is drawn in dashed lines to represent that it/they may be positioned at various locations on the sod harvester's stacking components. For example, sensor 610 could measure a load (or weight) on pallet support 330, an angle of sensor support 330 relative to vertical channel 310 (e.g., whether and to what extent the angle is greater than 90 degrees), a position of the rear end (or rear portion) of pallet support 330 relative to travelling mechanism 320, etc. In embodiments where sensor 610 measures the amount of weight that pallet support 330 is currently supporting, control system 600 can calculate the amount of deflection from the x,y plane based on the currently measured weight.

Control system 600 could receive signals from sensor 610 during the stacking process and use such signals to determine whether deflection is occurring and the extent of deflection for purposes of determining an "adjusted stacking position." An adjusted stacking position should be construed as a stacking position that control system 600 dynamically determines based on a current orientation of the pallet such as, for example, when the pallet is angled rearwardly due to deflection of pallet support 330. As one example, in embodiments where sensor 610 measures a load on pallet support 330, control system 600 could receive signals defining the current load from sensor 610 and use the current load to select an adjustment to apply to the stacking position(s) of the stacking head (e.g., using a mapping table that maps loads to stacking position offsets). In such cases, control system 600 could apply such adjustments or offsets to "default stacking position(s)" that would otherwise be used if pallet support 330 was not deflected.

Figure 6B:
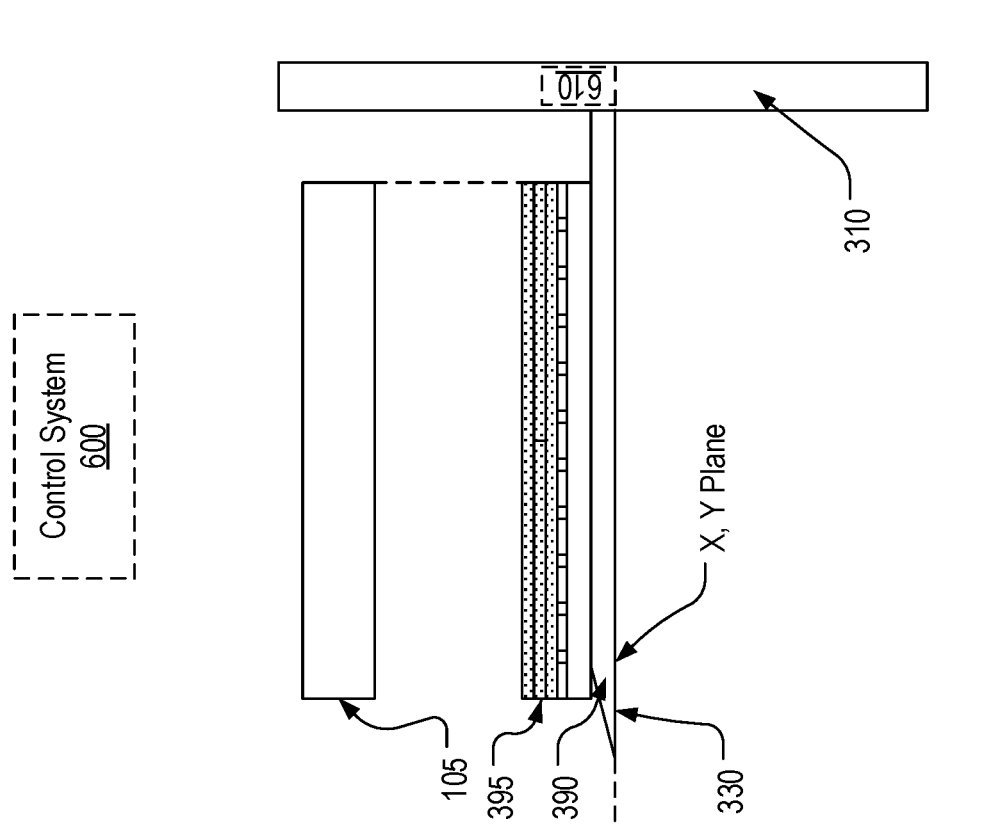
FIGS. 6A-6E provide an example of how a control system of a sod harvester can dynamically adjust the stacking position of the stacking head while stacking sod on a pallet based on a changing horizontal orientation of the pallet caused by the increasing weight of the stacked sod.
Figure 6A:
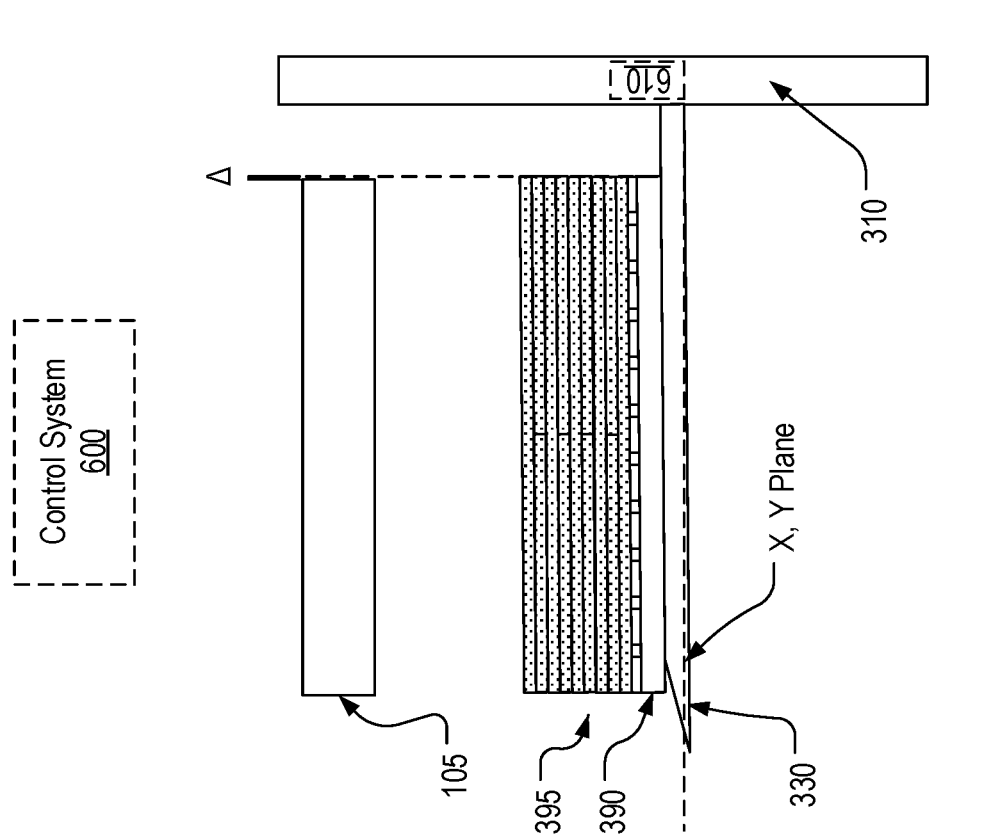

Turning to FIG. 6A, pallet support 330 is shown as not being deflected from the x, y plane. Accordingly, control system 600 can cause stacking head 105 to be moved to the default stacking positions when stacking sod on pallet 390. For illustrative purposes, stacking head 105 is shown as having the same width as pallet 390 and therefore aligns with pallet 390 when in the depicted default stacking position, but this need not be the case.

Turning to FIG. 6B, the additional layers of sod on pallet 390 have caused the rear end of pallet support 330 to deflect downwardly from the x, y plane. Sensor 610 can detect this deflection in any suitable manner and report it to control system 600. Control system 600 can respond by causing stacking head 105 to be moved to adjusted stacking positions. For example, in FIG. 6B, the depicted adjusted stacking position is shifted rearwardly within the x, y plane by an offset (Δ) relative to the default stacking position depicted in FIG. 6A. This offset accounts for the fact that the deflection of pallet support 330 causes the front, top edge of the stack to be shifted rearwardly. Accordingly, by using the adjusted stacking position, the sod will fall directly on top of the topmost layer as opposed to falling slightly frontward of the topmost layer. Although the other three stacking positions are not shown in the figures, a similar rearward offset could be applied to ensure that all slabs in the layers are shifted appropriately to account for the deflection.

Figure 6C:
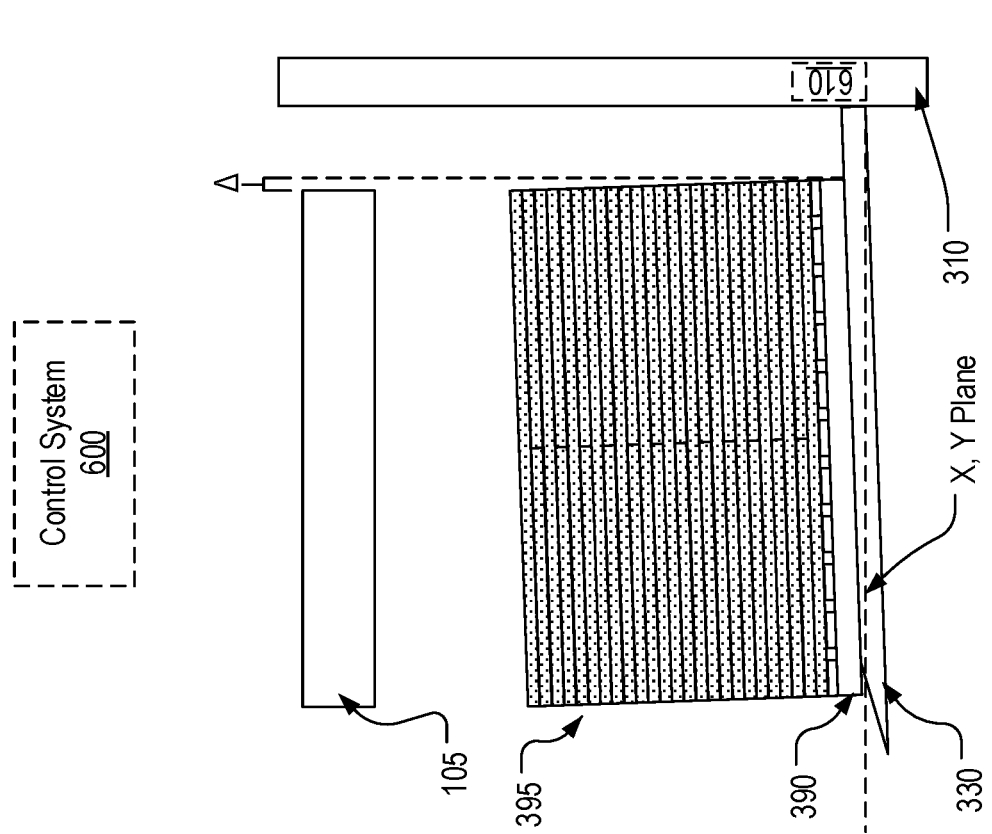
Figure 6D:
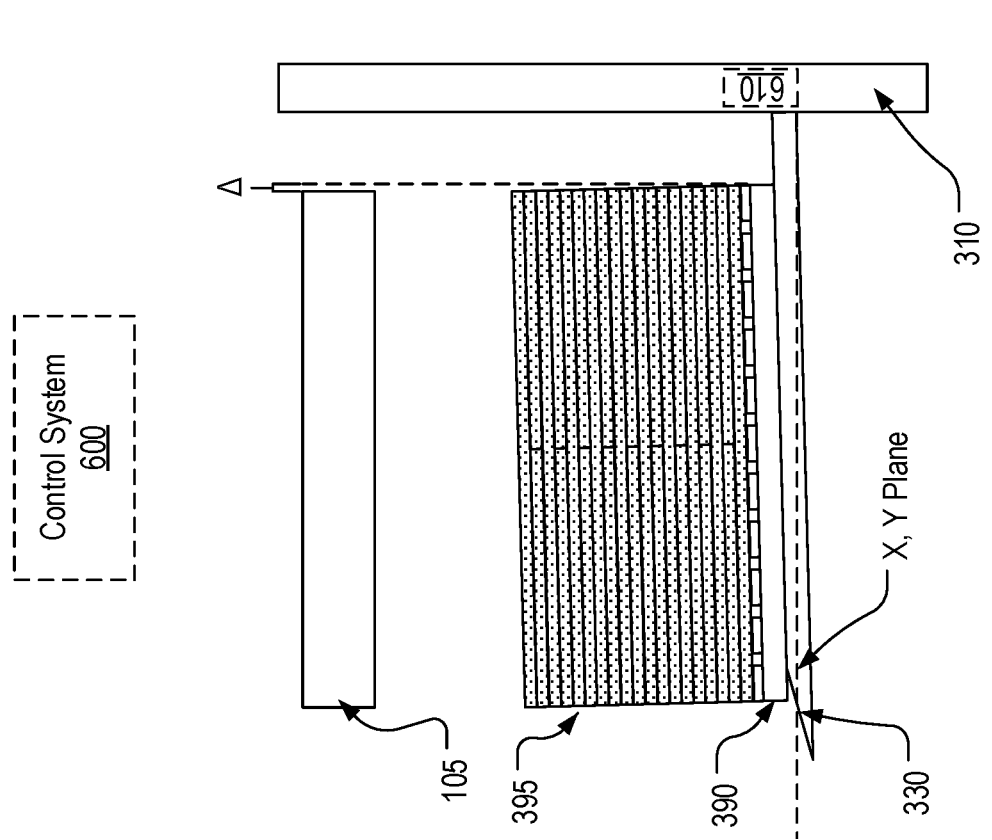
Figure 6E:
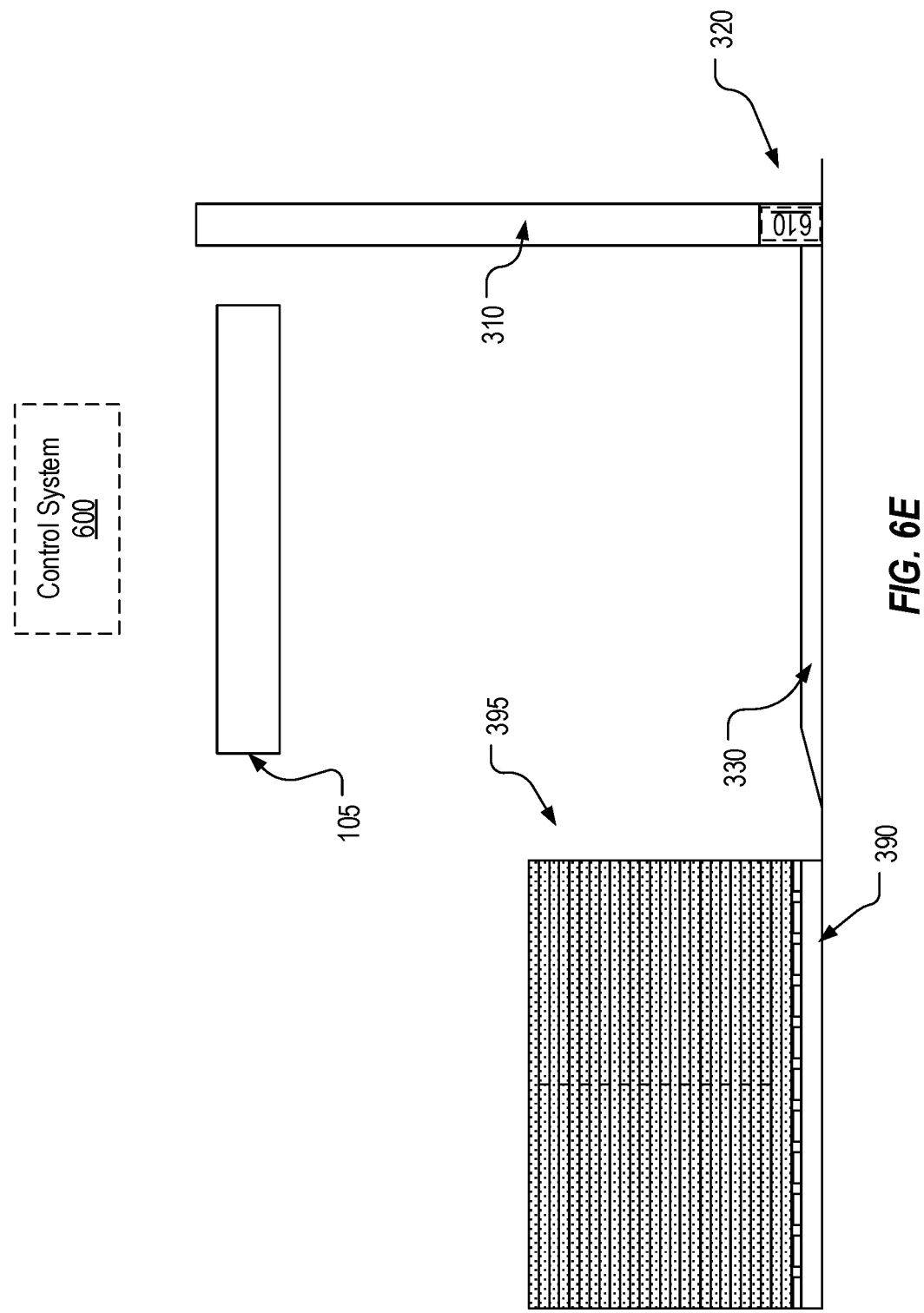

In FIG. 6C, and as additional layers are stacked on pallet 390 thereby causing the rear end of pallet support 330 to deflect farther, sensor 610 can continue to report the deflection to control system 600 which in turn can continue to adjust the stacking positions. In particular, control system 600 can increase the offset (Δ) to account for the increased deflection and increased rearward pivoting of the top of the stack. FIG. 6D likewise shows this continued adjustment to the stacking position. Finally, as shown in FIG. 6E, once the stack is complete and pallet 390 is lowered to the ground, the stack will be vertically aligned due to the continuous adjustment in the stacking position.

FIGS. 7A-7D provide an example of how control system 600 can employ a sensor (or multiple sensors) 611 to detect when the sod harvester is travelling over a sloped area and in response can adjust the stacking position of stacking head 105. In this example, sensor 611 is shown as being located on stacking head 105. However, any number of sensors 611 could be located anywhere on the sod harvester where they will be able to detect when the sod harvester is on sloped ground (i.e., to detect when the x, y plane deviates from the horizontal). For example, sensor 611 could represent an accelerometer. Alternatively, sensor 611 could represent a GPS component that can detect the location of the sod harvester and use known slope information for the area where the sod harvester is operating to determine when the sod harvester is travelling over sloped ground.

This sloped scenario differs from the deflected pallet support scenario in that the entire sod harvester—including stacking head 105—will deviate from the horizontal when harvesting in a sloped area as opposed to only pallet support 330 deviating from the x, y plane. However, a similar technique of adjusting the stacking position can be employed in the sloped scenario to ensure that vertically aligned stacks are formed except that the direction of the adjustment is opposite the direction used in the deflected pallet support scenario.

For example, in FIG. 7A, it is assumed that the sod harvester travels on flat ground while stacking the first eight layers of the stack. For illustrative purposes, it is assumed that stacking head 105 aligns with pallet 390 when in the default stacking position as represented by the dashed line. Accordingly, when on flat ground and when stacking head 105 is in the default stacking position, sod 395 will fall straight down onto the intended location on pallet 390. As represented in FIG. 7B, it is assumed that the sod harvester travels into a leftwardly sloped area. As a result, both stacking head 105 and pallet support 330 (and therefore the partially formed stack) pivot towards the left. For illustrative purposes, stacking head 105 is still shown in the default stacking position which aligns with pallet 390. However, the line of alignment is no longer vertical. Therefore, as described in FIGS. 5A-5D, if additional sod 395 is dropped from the default stacking position and falls straight down due to gravity, it will not land in the intended location on the stack. To the contrary, it will be shifted to the left (i.e., shifted downhill of any layers that were stacked while the sod harvester was on flat ground).

To account for this, control system 600 can receive signals from sensor 611 to detect when and in which direction the sod harvester's x, y plane deviates from the horizontal. In response to detecting that the sod harvester's x, y plane is deviated from the horizontal, control system 600 can determine an adjusted stacking position to be used. Turning to FIG. 7C, it is assumed that control system 600 determines the adjusted stacking position by applying an offset (A) to the default stacking position. For example, control system 600 could maintain mappings between deviations and offsets. In effect, using an adjusted stacking position causes stacking head 105 to be shifted uphill so that, when sod 395 falls directly downward as represented by the arrow in FIG. 7C, it will land in the intended location on the stack as represented in FIG. 7D.

Control system 600 could perform this technique to detect and account for vertical misalignment that would otherwise occur whenever the sod harvester is harvesting on a sloped area regardless of the direction of the slope. For example, if control system 600 determines that the sod harvester is harvesting while travelling downhill, it could apply an appropriate offset to the default stacking position to cause the resulting adjusted stacking position to be rearward (or uphill) from the default stacking position. Likewise, if control system 600 determines that the sod harvester is harvesting uphill while also being sloped downward to the right (i.e., when not travelling directly up the hill), it could apply an appropriate offset to the default stacking position to cause the resulting adjusted stacking position to be frontward and to the left. In more technical terms, the offset could be in both the x and y directions to offset any deviation from the horizontal in the x, y plane.

Notably, as control system 600 makes such adjustments in the stacking position to account for this sloped scenario, pallet support 330 may deflect due to the increasing weight of the stack. Accordingly, in some embodiments, control system 600 could simultaneously make adjustments to account for the deflection. As one example only, control system 600 could calculate what the offset should be to account for the slope and separately calculate what the offset should be to account for deflection of pallet support 330 and then sum the offsets together to determine how far and in which direction(s) the stacking position should be shifted. For example, if the default stacking position is represented as an x, y value, the adjusted stacking position could be determined by incrementing or decrementing the x and/or y by the calculated offset that control system 600 determines based on the signals received from sensor 610 and/or sensor 611.

Figure 8:
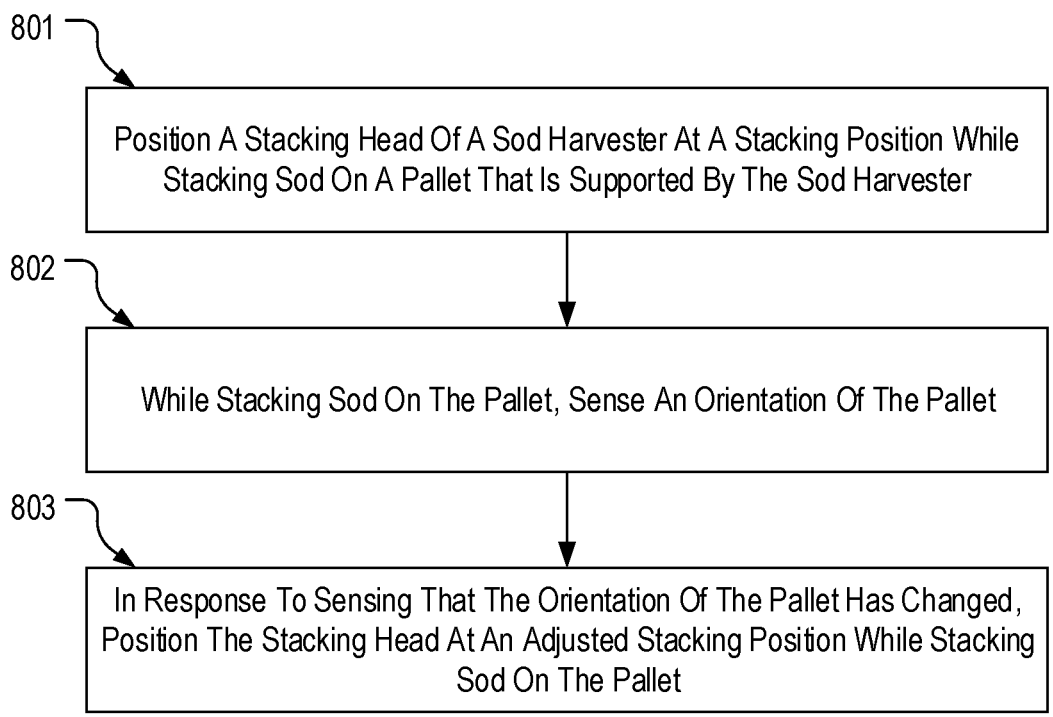
FIG. 8 is a flowchart of an example method for adjusting a sod harvester's stacking position to form vertically aligned stacks.

FIG. 8 provides a flowchart of an example method 800 for adjusting a sod harvester's stacking position to form vertically aligned stacks. Method 800 could be performed by control system 600 of any suitable sod harvester and to account for a variety of scenarios that may otherwise cause a stack to be vertically misaligned.

Method 800 includes an act 801 of positioning a stacking head of a sod harvester at a stacking position while stacking sod on a pallet that is supported by the sod harvester. For example, control system 600 could cause stacking head 105 to be positioned in a default stacking position or a previous adjusted stacking position while stacking sod 395 on pallet 390 that is supported by pallet support 330.

Method 800 includes an act 802 of sensing an orientation of the pallet while stacking sod on the pallet. For example, control system 600 could receive signals from sensor(s) 610 representing whether pallet support 330 is deflected. Alternatively or additionally, control system 600 could receive signals from sensor(s) 611 representing whether the sod harvester is travelling over a sloped area.

Method 800 includes an act 803 of, in response to sensing that the orientation of the pallet has changed, positioning the stacking head at an adjusted stacking position while stacking sod on the pallet. For example, in response to detecting that a deflection of pallet support 330 has changed or that the slope of the ground over which the sod harvester is travelling has changed, control system 600 can cause stacking head 105 to be positioned at one or more adjusted stacking positions. Control system 600 may calculate the one or more stacking positions based on the detected deflection of pallet support 300 and/or the detected slope of the ground over which the sod harvester is travelling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for adjusting a sod harvester's stacking position to form vertically aligned stacks, the method comprising:
   moving a stacking head of a sod harvester from above a stacking conveyor to a stacking position while stacking sod on a pallet that is supported by the sod harvester;
   while stacking sod on the pallet, sensing an orientation of the pallet by detecting a deflection of the pallet from an x, y plane of the sod harvester; and
   in response to sensing that the orientation of the pallet has changed, moving the stacking head from above the stacking conveyor to an adjusted stacking position different from the stacking position while stacking sod on the pallet.

2. The method of claim 1, wherein the stacking position is a default stacking position.

3. The method of claim 1, wherein the adjusted stacking position is offset from the stacking position within an x, y plane of the sod harvester.

4. The method of claim 1, wherein detecting the deflection of the pallet from the x, y plane comprises detecting the deflection of a pallet support.

5. A method for adjusting a sod harvester's stacking position to form vertically aligned stacks, the method comprising:
   moving a stacking head of a sod harvester from above a stacking conveyor to a stacking position while stacking sod on a pallet that is supported by the sod harvester;
   while stacking sod on the pallet, sensing an orientation of the pallet, wherein sensing the orientation comprises one or more of:
     sensing an orientation of a pallet support;
     sensing a weight of sod supported by the pallet support; or
     detecting that the sod harvester is travelling over a sloped area; and
   in response to sensing that the orientation of the pallet has changed, moving the stacking head from above the stacking conveyor to an adjusted stacking position different from the stacking position while stacking sod on the pallet.

6. The method of claim 1, further comprising:
   calculating the adjusted stacking position based on the orientation.

7. The method of claim 1, wherein sensing the orientation of the pallet comprises repeatedly sensing the orientation of the pallet during a plurality of stacking operations; and wherein moving the stacking head to the adjusted stacking position comprises moving the stacking head for each of the plurality of stacking operations based on the orientation sensed for the respective stacking operation.

8. A control system of a sod harvester that is configured to adjust the sod harvester's stacking position to form vertically aligned stacks by performing the following:
   continuously sensing an orientation of a pallet on which a stacking head of the sod harvester is stacking sod;
   based on the sensing, calculating an adjusted stacking position, the adjusted stacking position comprising an offset within an x, y plane of the sod harvester; and
   causing the stacking head to be positioned at the adjusted stacking position when stacking sod on the pallet to thereby cause a vertically aligned stack to be formed on the pallet.

9. The control system of claim 8, wherein the orientation is relative to an x, y plane of the sod harvester.

10. The control system of claim 8, wherein sensing the orientation of the pallet comprises sensing an orientation of a pallet support.

11. The control system of claim 10, wherein sensing the orientation of the pallet support comprises detecting or calculating a deflection of the pallet support due to a weight of the pallet.

12. The control system of claim 8, wherein sensing the orientation of the pallet comprises detecting that the sod harvester is travelling over a sloped area.

13. A sod harvester comprising:
    a cutting head for removing sod from the ground;
    one or more inclined conveyors for conveying the sod from the cutting head to a stacking conveyor;
    the stacking conveyor;
    a stacking head for removing the sod from the stacking conveyor and stacking the sod on a pallet; and
    a control system that is configured to perform the following to form vertically aligned stacks of the sod on the pallet:
      move the stacking head from above the stacking conveyor to a stacking position while stacking the sod on the pallet;
      while stacking the sod on the pallet, detecting an orientation of the pallet by detecting a deflection of the pallet from an x, y plane of the sod harvester; and
      in response to detecting that the orientation of the pallet has changed, moving the stacking head from above the stacking conveyor to an adjusted stacking position different from the stacking position while stacking the sod on the pallet.

14. The sod harvester of claim 13, wherein detecting the orientation of the pallet also comprises
    detecting a slope of ground over which the sod harvester is travelling.

15. The sod harvester of claim 14, wherein the adjusted stacking position is offset from the stacking position within the x, y plane of the sod harvester.

16. The sod harvester of claim 13, further comprising:
    one or more sensors that provide signals to the control system indicative of the orientation of the pallet.

17. The sod harvester of claim 13, wherein the stacking head employs multiple stacking positions when stacking the sod on the pallet, and wherein moving the stacking head to the adjusted stacking position comprises moving the stacking head to multiple adjusted stacking positions.

* * * * *